Aug. 28, 1962  R. E. WUORIO  3,050,826
TUBE ROTATING
Filed April 17, 1959

INVENTOR.
RAYMOND ERO WUORIO
BY Russell L. Root
George W. Reiber
ATTORNEYS 3,050,826
TUBE ROTATING
Raymond Ero Wuorio, Maynard, Mass., assignor to American Can Company, New York, N.Y., a corporation of New Jersey
Filed Apr. 17, 1959, Ser. No. 807,151
3 Claims. (Cl. 29—38)

This invention relates to rotating, by means of supporting mandrels, cylindrical containers having each an open end and a closed or partially closed end, and especially to a device and method for rotating collapsible tubes during finishing operations such as trimming, threading, capping and the like.

In the handling and rotating of tubular containers, especially cylindrical collapsible tubes, it is frequently convenient to mount the tubes on cylindrical spindles or mandrels which can be conveyed in a series, transversely of their lengths, into and out of one or more work stations and which are rotated at one or more stations to assist in the work. Usually, although not necessarily, the mandrels are mounted on a turret to project axially therefrom, and the turret is rotatively indexed periodically by any convenient indexing mechanism.

So that the tubes may be easily and accurately placed on the mandrels it is convenient to have the mandrels constructed with a diameter significantly less than the inside diameter of the tubes to be handled, and to provide some means such as an exterior pinch roller at the working station to press the tube against the mandrel and assure its proper rotation to effect the work at hand, since the ordinary grip of the tube on the slightly undersized mandrel may not be sufficient to do so. An arrangement of this sort is shown in U.S. Patent No. 1,076,985.

Experience has shown, however, that the effectiveness of the above described arrangement is rather limited. For most purposes it is essential that the tube be fully seated on the mandrel in order that its position should be correct to provide accurate gauging for trimming and the like, or so that the breast will seat firmly against the mandrel end to provide for effective coaction with the capping head or other axially approaching work member. However, whether manually or automatically placed, it is difficult to insure that every tube shall be loaded in fully seated position on its mandrel, and even assuming this condition initially, there is no way to insure its continuance, for normal machine vibration in concert with the necessarily loose fit of the tubes on the mandrels frequently conspires to unseat the tube a certain amount as it is moved from station to station.

For these reasons the arrangement shown in Patent No. 1,076,985 has tended to fall into disuse and other devices have been substituted therefor. In the metal tube art it has become customary to insure rotation of the tube with its mandrel by forceably driving the tube axially onto a slightly oversized toothed or fluted mandrel portion at the neck so as to form a more or less positive driving connection. With tubes other than metal, the mandrel is sometimes constructed with relatively movable sections for actuating a flexible radially expansible and contractible portion so that the tube can be frictionally gripped from the interior. While effective to insure tube rotation, both of these approaches have drawbacks which are not inconsiderable and which seriously limit their practically for other reasons. In the case of the former, metal chips or slivers are frequently formed which are difficult to remove and may remain in the neck portion of the tube to contaminate the product with which it is ultimately filled. The latter arrangement is somewhat involved mechanically and suffers from the flaw that the flexible material used in the expanding portion of the mandrel wears out rapidly and has to be frequently replaced.

According to the present invention, I have discovered that the more recent approaches with their drawbacks are not necessary to secure effective tube and mandrel cooperation, but that with a minor physical modification the basic simplicity of the tube rotating method and arrangement shown in Patent No. 1,076,985 can be retained and its serious drawbacks overcome.

It is an object, therefore, of the present invention to provide for rotating a tubular container on a somewhat loosely fitting mandrel by bringing into contact with the same an exterior friction roller, but to do so in such a manner that the difficulties of assuring a predetermined desired axial position of the tube on the mandrel are overcome.

A feature of the present invention is the arrangement of the friction roller axis at a small angle to the mandrel axis, such that the motion vector of the roller when represented by the tangent to the peripheral track of the roller at the point of contact, has a significant component directed away from the free end of the mandrel.

Other objects, features and advantages will appear hereinafter as the description proceeds.

Figure 1:
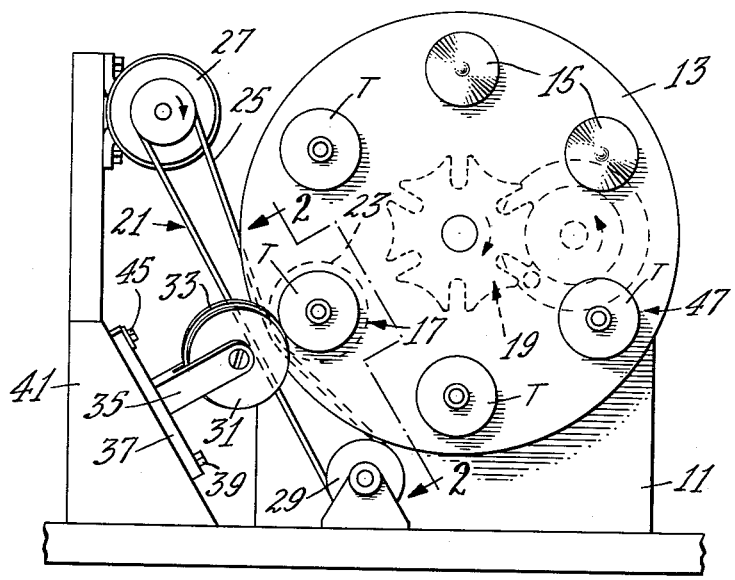
FIG. 1 is a front elevation of a machine employing the features of the present invention.

Referring to the drawing, there is illustrated one form of conveyor mechanism consisting of a frame 11 rotatably carrying a turret 13 upon which are rotatably mounted a plurality of mandrels 15. The turret 13 may be intermittently rotated to bring each of the spindles 15 in turn into a work station, such as that indicated at 17, by any suitable indexing device, for example Geneva drive 19. When each mandrel reaches the work station 17, it is rotated by a suitable mechanism for the purpose. In the form shown this mechanism is designated 21 and includes a driven pulley 23 on the base end of each mandrel which runs in frictional contact with a driving belt 25 driven by motor 27 and supported by idler 29.

The mandrels 15 are designed to have a loose sliding fit in the tubes T to be handled, so that the tubes may be readily placed thereon without sticking or interference, but so that there will also a rudimentary frictional engagement between the mandrel and tube to provide some restraint of tube motion relative to the mandrel during indexing. In other words, the mandrels 15 are made as large as possible without interfering with the convenient and rapid placing of tubes T thereon.

At work station 17 is provided a friction roller 31 having a resilient frictional tire element 33. The roller is supported by a fork 35 mounted on a plate 37 which has one end pivoted as at 39 to a support member 41 on frame 11, and which is provided with a slot 43 receiving a clamp screw 45. The positioning of the roller 31 radially of the turret is such that it comes into firm frictional engagement with the surface of each mandrel 15, or a tube T placed thereon, as the mandrel is indexed into the work station 17. It will be understood that the pressure of the tire 33 against the mandrel can be adjusted to the desired value, for example by providing shims under block 37, or by any suitable continuous adjusting means introduced into the fork 35 or support member 41.

Figure 2:
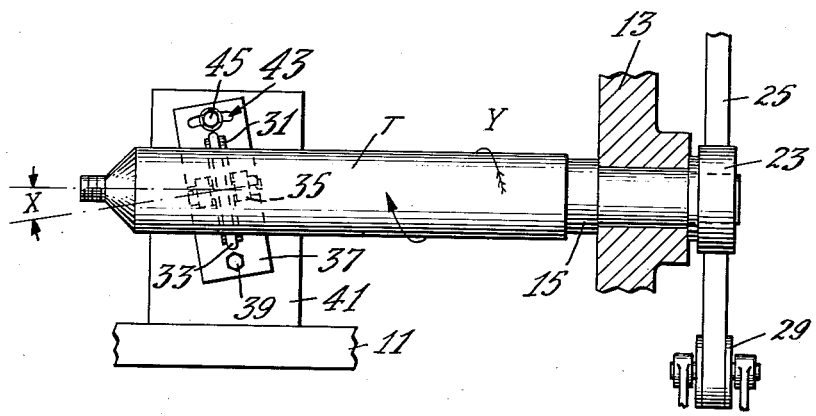
FIG. 2 is a detail view, partly in section, to a larger scale, taken substantially on line 2—2 of FIG. 1.

As can be seen in FIG. 2 especially, the plate 37 is adjustable about its pivot 39 to introduce an angularity between the axis of the mandrel 15 and the axis of the roller 31, and when the desired setting is reached, the roller position can be maintained by tightening the clamp screw 45. As can be seen from FIG. 2, the angle of nonparallelism $x$ between the axis of the mandrel and the axis of the roller 31, measured in a plane including the common tangent and parallel to the mandrel axis, is measured in a direction such that the motion vector of the roller 31, when indicated by a line tangent to the peripheral track of the roller at the point of contact, has a small but significant component directed away from the free end of the mandrel 15 and towards the turret 13. That is to say that with the parts as seen in FIG. 2, and with the mandrel 15 rotating in the direction indicated by arrow *y*, the rotation of roller 31 due to the frictional contact of its tire 33 through the wall of tube T with rotating mandrel 15 will also produce a frictional urging of the tube T axially to the right.

The proper value for angle *x* is largely a matter of experiment and depends on various factors, such as the length and stiffness of the mandrels 15 and the amount of side load by roller 31 that can be tolerated, in addition to the frictional nature of the material of which the tubes T are made, how far the tubes are initially placed on the mandrels, the strength of any tendency tending to work them off the mandrels between stations, and the like. For ordinary purposes where the tubes are initially placed fully on the mandrels and the working-off tendency is not undue, it has been found that values of angle *x* below 10° and frequently in the neighborhood of 5° are sufficient for proper operation. However, it will be understood that the setting will be made with an angle *x* sufficient to seat the tube firmly against the mandrel end quickly, for example within the first half dozen revolutions after reaching station 17, so as to be ready without delay for whatever work operation is to be performed. In addition, with a setting such as this, any random tendencies for the tube to work off of the mandrel by reason of factors which may be introduced by the work step will be reliably counteracted by the roller 31.

While the embodiment so far described has merely a single roller 31 placed at the work station 17, it will be understood that similar rollers can be employed at other stations where additional working steps are to be performed, or a roller 31 could be employed together with mandrel rotating means at a preliminary station, for example the bottom position in FIG. 1, in a preparatory placement capacity to assure substantially full seating of the tube before moving into the work station, whereby the tube could be worked on instantaneously upon arrival at the station.

In operation, the turret 13 is indexed periodically by the Geneva movement 19, and each mandrel in turn is brought into the work station 17. At a previous station, for example that designated 47, a fresh tube to be worked on can be placed on the mandrel each time the turret indexes. When an unworked tube T finally reaches station 17, its side wall is pinched frictionally between the mandrel 15 and the tire 33 on roller 31. Because of the angular setting of the roller 31 a few rotations of mandrel 15 induced by its rotary drive means 21 serve to urge the tube T fully to the right as seen in FIG. 2 with the interior breast surface seated firmly against the mandrel end. Thereafter any desired work operation, such as applying a threaded cap to the tube neck, is performed. When the finished tube is indexed to a subsequent station it may be doffed in any convenient manner.

While the foregoing description presents the tube as having its closed end urged against the mandrel end to determine the correct tube position, it will be understood that any other portion of the tube, such as the open end thereof can impinge on any other suitable gauging stop, such as mandrel collar or the like, to determine proper position at the work station.

From the foregoing description it can be seen that I have provided a method and means for reliably rotating a tube with its mandrel without interfering with the loading of the tube on the mandrel, and further avoiding the mechanical complexity and/or the potential tube damage characteristic of devices and methods in current use.

While, in order to comply with the statute, the invention is described in language which is rather specific as to structural features and arrangements, it is to be understood that the invention is not limited to the specific details shown, but that the means herein disclosed comprises the preferred of several modes of putting the invention into effect, and the invention is therefore claimed in any of its forms or modifications within the scope of the language employed in the appended claims.

I claim:

1. For use in supporting and rotating a tubular container having an open end and a portion cooperable with a stop surface on a mandrel to determine appropriate axial relationship therebetween, the combination of a rotatable cylindrical mandrel having a base end, a free end, and a stop surface; means for rotating the mandrel about its axis to frictionally rotate the container therewith; and means for holding a container on said mandrel and causing the same to rotate therewith, comprising an idle roller positioned adjacent said mandrel and having a frictional periphery in contact with the wall of the container on said mandrel, the axis of rotation of said roller being slightly out of parallel with the axis of said mandrel in a direction such that the motion vector of the roller in response to mandrel rotation, when indicated by a line tangent to the peripheral track of the roller at the point of contact with the container, has a component directed away from the free end of the mandrel and towards the base end thereof to urge the container along the mandrel to a predetermined position wherein its stop surface cooperating portion is seated against the stop surface of said mandrel, and to maintain this predetermined position.

2. The device set forth in claim 1 wherein the angle of non-parallelism between the mandrel and roller has a value such that containers placed on the mandrel and in contact with the roller will normally seat themselves with the stop surface cooperable portion against the mandrel stop surface in a few revolutions of the mandrel.

3. The method of frictionally rotating a cylindrical container having an open end and a portion cooperable with a stop surface on a mandrel, by means of a mandrel having a free end, a base end and a stop surface thereon, which comprises slipping the container over the mandrel, bringing the container into contact with an idle friction roller to squeeze the wall thereof between the mandrel and roller, and setting the roller axis so as to deviate slightly from parallelism with the mandrel axis, and rotating the mandrel in a direction such that the motion vector of the roller in response to mandrel rotation, when indicated by a line tangent to the peripheral track of the roller at the point of contact with the container, has a component directed away from the free end of the mandrel and towards the base end thereof.

References Cited in the file of this patent

UNITED STATES PATENTS

| | | |
|---|---|---|
| 2,526,900 | Remington | Oct. 24, 1950 |
| 2,634,868 | Remington | Apr. 14, 1953 |